(12) United States Patent
Yang (10) Patent No.: US 11,277,813 B2
(45) Date of Patent: Mar. 15, 2022

(54) PAGING IN A COMMUNICATION NETWORK

(71) Applicant: Telefonaktiebolaget LM Ericsson (publ), Stockholm (SE)

(72) Inventor: Bo Yang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/611,391

(22) PCT Filed: Dec. 29, 2017

(86) PCT No.: PCT/CN2017/119968
§ 371 (c)(1),
(2) Date: Nov. 6, 2019

(87) PCT Pub. No.: WO2019/127413
PCT Pub. Date: Jul. 4, 2019

(65) Prior Publication Data
US 2020/0205121 A1    Jun. 25, 2020

(51) Int. Cl.
*H04W 4/00*       (2018.01)
*H04W 68/00*     (2009.01)
(Continued)

(52) U.S. Cl.
CPC .......... *H04W 68/005* (2013.01); *H04W 8/08* (2013.01); *H04W 76/11* (2018.02)

(58) Field of Classification Search
CPC ..... H04W 8/08; H04W 68/00; H04W 68/005; H04W 68/02; H04W 68/04; H04W 76/11
See application file for complete search history.

(56) References Cited

U.S. PATENT DOCUMENTS

2008/0119209 A1    5/2008  Upp
2008/0153489 A1*  6/2008  Lee .................. H04W 8/085
                                                      455/435.1
(Continued)

FOREIGN PATENT DOCUMENTS

WO     2008 146868 A1    12/2008
WO     2016 113302 A1     7/2016
(Continued)

OTHER PUBLICATIONS

3GPP TS 36.331 v14.2.2—Apr. 2017.
(Continued)

*Primary Examiner* — Matthew W Genack
(74) *Attorney, Agent, or Firm* — Christopher & Weisberg, P. A.

(57) ABSTRACT

Various embodiments of the present disclosure provide a method for paging in a communication network. The method comprises receiving mobility information of a terminal device by a core network node from an access network node serving the terminal device. The method further comprises determining a paging policy for the terminal device by the core network node according to the mobility information. According to the embodiments of the present disclosure, a terminal device can be paged differentially based at least in part on mobility information of the terminal device, so that system performance and energy efficiency of the communication network can be improved.

15 Claims, 5 Drawing Sheets

(51) Int. Cl.
H04W 76/11 (2018.01)
H04W 8/08 (2009.01)

(56) References Cited

U.S. PATENT DOCUMENTS

| | | | | |
|---|---|---|---|---|
| 2014/0155109 | A1* | 6/2014 | Vaidya | H04W 8/06 |
| | | | | 455/458 |
| 2015/0181550 | A1* | 6/2015 | Ward | G01S 5/02 |
| | | | | 455/456.1 |
| 2015/0271782 | A1 | 9/2015 | Ljung et al. | |
| 2015/0289229 | A1* | 10/2015 | Ahluwalia | H04W 68/02 |
| | | | | 455/458 |
| 2016/0360336 | A1* | 12/2016 | Gross | H04M 1/72403 |

FOREIGN PATENT DOCUMENTS

| | | | |
|---|---|---|---|
| WO | 2016 150269 | A1 | 9/2016 |
| WO | 2016 186416 | A1 | 11/2016 |
| WO | 2016 205997 | A1 | 12/2016 |
| WO | 2016208997 | A1 | 12/2016 |

OTHER PUBLICATIONS

International Search Report for International application No. PCT/CN2017/119968—dated Jul. 31, 2018.
3GPP TSG-RAN WG2 #94; Nanjing, China; Source: NTT Docomo, Inc.; Title: Paging enhancements for signalling reduction (R2-164226)—May 23-27, 2016.
Extended European Search Report issued for Application No./Patent No. 17936401.3-1231 / 3603240 PCT/CN2017119968—dated Sep. 30, 2020.
EPO Communication dated Nov. 29, 2021 for Patent Application No. 17936401.3, consisting of 7-pages.

* cited by examiner

PAGING IN A COMMUNICATION NETWORK

This nonprovisional application is a U.S. National Stage Filing under 35 § 371 of international Patent Application Serial No. PCT/CN2017/119968 filed Dec. 29, 2017 and entitled "PAGING IN A COMMUNICATION NETWORK" which is hereby incorporated by reference in its entirely.

FIELD OF THE INVENTION

The present disclosure generally relates to communication networks, and more specifically, to paging in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and radio technologies such as an Internet of things (IoT) or a cellular Internet of things (CIoT), a cellular mobile network, such as evolved universal terrestrial radio access network (EUTRAN) and global system for mobile communication (GSM) enhanced data rate for GSM evolution radio access network (GERAN), may accommodate not only human handsets, but also machines and sensors. For IoT data transmission using a cellular mobile network, a terminal device or user equipment (UE) such as an IoT device may communicate with a peer end or an application server. When the peer end or the application server needs to reach the IoT device in the cellular mobile network, a paging message may be initiated for this IoT device from the core network (CN), in a similar way as to reach a handset. However, paging overload due to an increased number of terminal devices may affect network performance and user experience. Thus, it may be desirable to effectively decrease the paging load of the network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Nowadays, the volume of IoT device categories and use cases are soaring up. A communication network such as a cellular mobile network is providing a seamless roaming, bi-directional connection services to these devices, sensors, or indoor applications. With IoT devices growth, the paging load of the communication network will increase accordingly, which poses a potential challenge for the whole network capacity and performance. There may be a need to enhance paging capability of the communication network, so as to utilize radio resources in a more efficient way.

The present disclosure proposes a solution of paging in a communication network, which may enable terminal devices to be paged differentially based at least in part on respective mobility information of the terminal devices, so as to improve system performance and energy efficiency of the communication network.

According to a first aspect of the present disclosure, there is provided a method implemented at a core network node. The method may comprise receiving mobility information of a terminal device from an access network node serving the terminal device. The method may further comprise determining a paging policy for the terminal device according to the mobility information.

In accordance with an exemplary embodiment, the determined paging policy may indicate that a paging area for the terminal device comprises the serving cell of the terminal device, in response to the mobility information indicating that the terminal device is stationary.

In accordance with an exemplary embodiment, the method according to the first aspect of the present disclosure may further comprise sending a first request for an identifier of a serving cell of the terminal device to the access network node, and receiving a first response to the first request from the access network node to obtain the identifier of the serving cell in the first response.

In accordance with an exemplary embodiment, the method according to the first aspect of the present disclosure may further comprise paging the terminal device in the serving cell, in response to a paging request for the terminal device.

In accordance with an exemplary embodiment, said paging the terminal device in the serving cell may comprises transmitting a paging message for the terminal device to the access network node. The paging message may comprise the identifier of the serving cell to indicate the access network node to page the terminal device in the serving cell.

In accordance with an exemplary embodiment, the method according to the first aspect of the present disclosure may further comprise paging the terminal device in a tracking area to which the terminal device belongs, in response to a failure of paging the terminal device in the serving cell.

In accordance with an exemplary embodiment, the method according to the first aspect of the present disclosure may further comprise sending a second request for an identifier of a cell currently serving the terminal device to an access network node currently serving the terminal device, in response to a success of paging the terminal device in the tracking area.

In accordance with an exemplary embodiment, the method according to the first aspect of the present disclosure may further comprise receiving a second response to the second request from the access network node currently serving the terminal device, so as to obtain the identifier of the cell currently serving the terminal device in the second response.

In accordance with an exemplary embodiment, the method according to the first aspect of the present disclosure may further comprise determining whether to update a record of a current serving cell of the terminal device at the core network node, based at least in part on the obtained identifier.

In accordance with an exemplary embodiment, the determined paging policy may indicate that a paging area for the terminal device comprises a tracking area to which the terminal device belongs, in response to the mobility information indicating that the terminal device is movable.

In accordance with an exemplary embodiment, the method according to the first aspect of the present disclosure may further comprise paging the terminal device in the tracking area, in response to a paging request for the terminal device.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method implemented at a terminal device. The method may comprise determining mobility information of the terminal device. The method may further comprise providing the mobility information to a core network node for determination of a paging policy for the terminal device, through an access network node serving the terminal device.

In accordance with an exemplary embodiment, the mobility information may indicate that the terminal device is stationary. In this case, the paging policy may indicate that a paging area for the terminal device comprises a serving cell of the terminal device.

In accordance with an exemplary embodiment, the mobility information may indicate that the terminal device is movable. In this case, the paging policy may indicate that a paging area for the terminal device comprises a tracking area to which the terminal device belongs.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a determining unit and a providing unit. In accordance with some exemplary embodiments, the determining unit may be operable to carry out at least the determining step of the method according to the fifth aspect of the present disclosure. The providing unit may be operable to carry out at least the providing step of the method according to the fifth aspect of the present disclosure.

According to a ninth aspect of the present disclosure, there is provided a method implemented at an access network node. The method may comprise receiving mobility information of a terminal device from the terminal device served by the access network node. The method may further comprise forwarding the mobility information to a core network node for determination of a paging policy for the terminal device.

In accordance with an exemplary embodiment, the method according to the ninth aspect of the present disclosure may further comprise receiving a first request for an identifier of a serving cell of the terminal device from the core network node, in response to the mobility information indicating that the terminal device is stationary.

In accordance with an exemplary embodiment, the method according to the ninth aspect of the present disclosure may further comprise transmitting a first response to the first request to the core network node. The first response may comprise the identifier of the serving cell.

In accordance with an exemplary embodiment, the method according to the ninth aspect of the present disclosure may further comprise receiving a paging message for the terminal device from the core network node. The paging message may comprise the identifier of the serving cell. Correspondingly, the access network node may page the terminal device in the serving cell.

In accordance with an exemplary embodiment, the method according to the ninth aspect of the present disclosure may further comprise receiving another paging message for the terminal device from the core network node, in response to a failure of paging the terminal device in the serving cell. Correspondingly, the access network node may page the terminal device in all cells pertaining to the access network node.

Optionally, the access network node may receive a second request for an identifier of a cell currently serving the terminal device from the core network node, in response to a success of paging the terminal device in the cell pertaining to the access network node. In accordance with an exemplary embodiment, the access network node may transmit a second response to the second request to the core network node. The second response may comprise the identifier of the cell currently serving the terminal device.

According to a tenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon which, when executed on a computer, cause the computer to perform any step of the method according to the ninth aspect of the present disclosure.

According to a twelfth aspect of the present disclosure, there is provided an apparatus. The apparatus may comprise a receiving unit and a forwarding unit. In accordance with some exemplary embodiments, the receiving unit may be operable to carry out at least the receiving step of the method according to the ninth aspect of the present disclosure. The forwarding unit may be operable to carry out at least the forwarding step of the method according to the ninth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BS s, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an IoT scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on".

The term "one embodiment" and "an embodiment" are to be read as "at least one embodiment". The term "another embodiment" is to be read as "at least one other embodiment". Other definitions, explicit and implicit, may be included below.

Wireless communication technologies are currently being developed and improved to address the optimized network architecture and the enhanced communication coverage. For example, IoT is a new radio technology which may be able to provide extended coverage for harsh environments such as basements, and is designed to serve a number of UEs using limited resources. According to an exemplary embodiment, in order to reach a UE such as an IoT device in a communication network, a paging message may be transmitted for this UE from the CN. Paging capacity of a communication network is a crucial part in network capacity dimensioning, and the paging storm could paralyze a network if it were not designed appropriately.

In an exemplary paging scheme, the paging load in radio interface and CN entities may be reduced with assistance of radio access network (RAN) entities such as eNB. According to this paging scheme, the RAN entities may send a list of recommended cells to the CN for paging of a UE in idle mode. The recommended cells in the list consist of the UE's serving cells in connected mode and its neighbor cells which are tracked and recorded by the RAN entities. The CN may use such information to send paging messages to the list of recommended cells.

The idea of the above paging scheme is to request the eNB to record most of the cells which ever registered or served the UE, and then send a list of cells to the CN as the paging candidates. Therefore, the complexity of this scheme is high as it needs to track and forward the UE's serving and neighbor cells data which may be associated with multiple RAN entities and procedures such as radio access bearer (RAB) management and handover. This consequently increases RAN processing load for UEs in connected mode. On the other hand, the idea of the above paging scheme is using the UE's history information in connected mode as a paging reference for idle mode, which may pose a risk of degraded paging efficiency and success rate.

Different from human handsets, IoT devices may have different motion characteristics such as 'movable' or 'stationary'. A stationary IoT device like a monitor or an automatic vending machine may be located at a specific cell. Thus, a paging message for this device could be sent to just that cell rather than all cells in a tracking area which this device belongs to. According to some exemplary embodiments of the present disclosure, differentiated paging policies may be applied for various UEs/IoT devices with different motion characteristics.

In accordance with some exemplary embodiments, the present disclosure provides a paging solution to enable a core network node, for example, a Mobility Management Entity (MME), an Access and Mobility Management Function (AMF), etc., to configure differentiated paging policies based at least in part on mobility information of UEs. The proposed paging solution according to some exemplary embodiments may be assisted by UEs. This UE assisted paging solution would not introduce high processing load on RAN entities, and may be much simpler to implement in a core network node. According to the proposed paging solution, a UE such as an IoT device may notify a core network node whether it is stationary, for example, in a non-access stratum (NAS) message when registering to the core network node. Accordingly, the core network node may send a paging message just to the UE's serving cell through an access network node such as an eNB/gNB, in the case that the UE is a stationary device.

Many advantages may be achieved by applying the proposed paging solution according to the present disclosure. For example, sending paging message only to one cell rather than hundreds of cells in a tracking area can significantly decrease the paging load for a network. Accordingly, the network resource efficiency may be improved both on radio interface and on RAN entities. On the other hand, the proposed paging solution can achieve power saving for both stationary and mobile terminal devices. Generally, when a paging indicator is detected, each of terminal devices in the same paging group may need to read and decode the paging channel (PCH) frame to check whether there is a paging message for the terminal device. This may make a negative impact on power consumption of the terminal device. However, if the paging message is sent just to one cell, this kind of negative impact on power consumption can be minimized, so that the longer battery life time can be obtained.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 1:
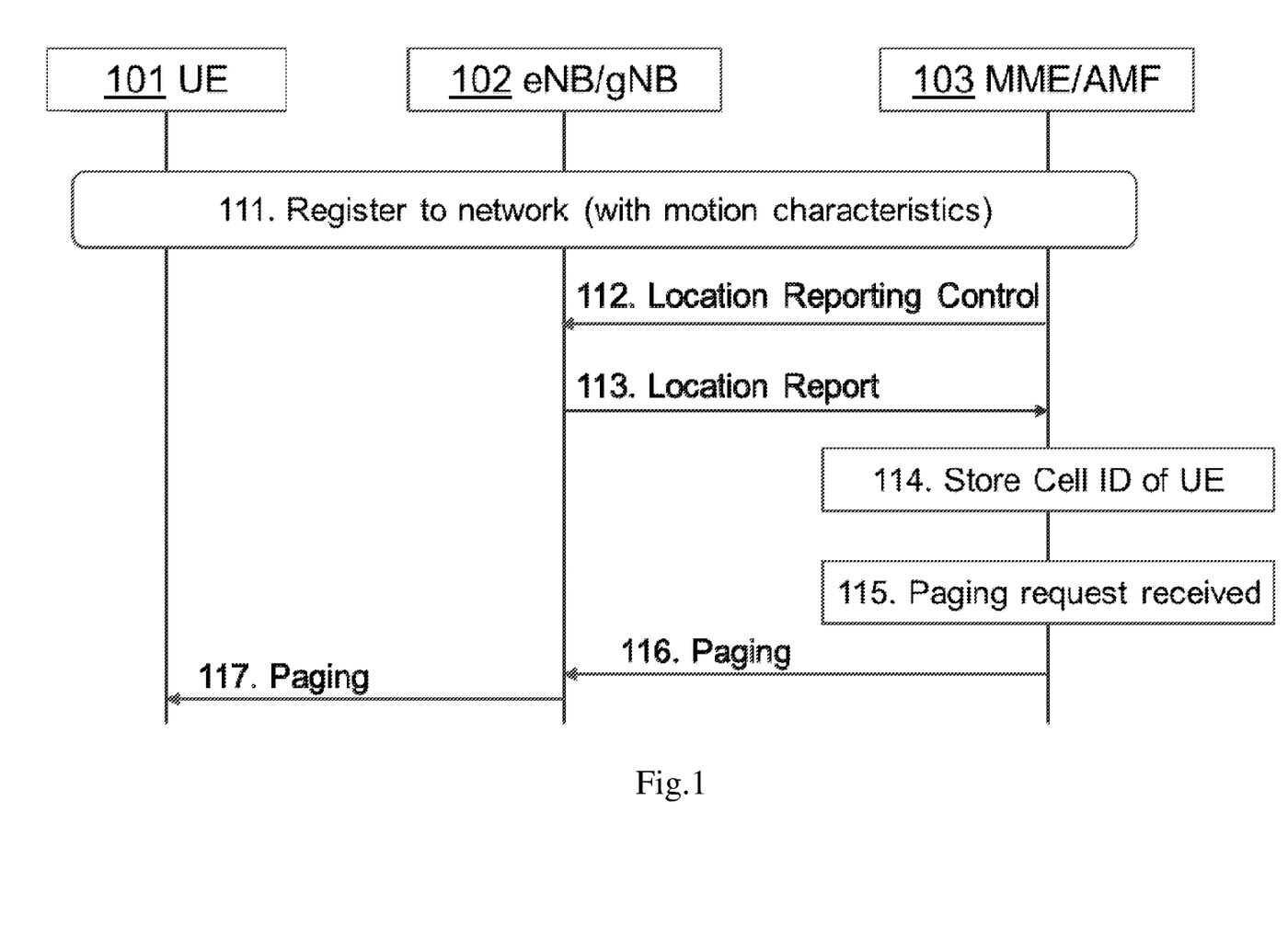
FIG. 1 is a diagram illustrating an exemplary paging procedure according to some embodiments of the present disclosure.

FIG. 1 is a diagram illustrating an exemplary paging procedure according to some embodiments of the present disclosure. For simplicity, FIG. 1 only depicts some exemplary network elements such as a UE 101, an eNB/gNB 102 and a MME/AMF 103. It will be appreciated that signaling messages and network elements in FIG. 1 are just shown as examples, and more or less alternative signaling messages and network elements may be involved in the paging procedure applicable to a communication network.

In accordance with an embodiment of the present disclosure, the UE 101 may have a set of characteristics and properties, such as supported codecs and encryption algorithms, vehicle-to-everything (V2X) communication over PC5 capability, or device properties. Such information of the UE 101 may be transferred to the MME/AMF 103 transparently through the eNB/gNB 102, for example, in a non-access stratum (NAS) message. As one of important UE's capabilities in the communication network, mobility information like motion characteristics of the UE 101 also may be added into the NAS message, for example, when the UE 101 registers 111 to the network in an attach procedure, as shown in FIG. 1.

In accordance with some exemplary embodiments, the mobility information of the UE 101 can inform the MME/AMF 103 of whether the UE 101 is movable or not. According to an embodiment, a parameter of 1-bit size may be used to represent the mobility information of the UE 101 in the NAS message which may be transparent to the eNB/gNB 102. Then, the MME/AMF 103 can store this parameter and optionally some other characteristics of the UE 101 for further usage.

In the case where the MME/AMF 103 recognizes that the UE 101 is stationary according to the mobility information of the UE 101, the MME/AMF 103 may invoke a location report procedure to get serving cell information for the UE 101. For example, the MME/AMF 103 may send 112 a location reporting control message to the eNB/gNB 102 to request the serving cell information for the UE 101, as shown in FIG. 1. Correspondingly, the eNB/gNB 102 may send 113 the requested serving cell information to the MME/AMF 103, for example, in a location report message. In accordance with an exemplary embodiment, the MME/AMF 103 may store 114 the serving cell information such as a cell identifier (ID) of the UE 101 for further paging usage.

In accordance with an exemplary embodiment, the MME/AMF 103 may be invoked to page the UE 101 to setup a connection with the UE 101. According to the procedure illustrated in FIG. 1, when the MME/AMF 103 receives 115 a paging request for the UE 101, the MME/AMF 103 may check the mobility information of the UE 101. If the UE 101 is movable, the MME/AMF 103 may send 116 a paging message for the UE 101 to all cells in a tracking area where this UE belongs. The tracking area may be defined as a free-moving area where the UE does not need to update its service, and usually consist of hundreds of cells. The tracking area may be used for paging and location update management according to network configurations. When a UE is in idle mode, the CN can know the tracking area where the UE belongs. The tracking area may be specified in accordance with a cell-level configuration. Multiple cells may be configured in the same tracking area, and a cell belongs to a specific tracking area.

Alternatively, if the MME/AMF 103 finds that the UE 101 is stationary, the MME/AMF 103 may initiate the paging of the UE 101 in a specific cell where the UE 101 is located, i.e. the serving cell of this UE. This specific cell may be identified by the serving cell ID stored for the UE 101 at the MME/AMF 103. For example, the MME/AMF 103 may send 116 a paging message to the eNB/gNB 102 with the serving cell ID of the UE 101, so as to indicate the eNB/gNB 102 to page 117 the UE 101 in the identified serving cell. Accordingly, the eNB/gNB 102 may broadcast a paging message in the identified serving cell of the UE 101.

Optionally, if the paging of the UE 101 in the identified serving cell fails, which may rarely happen though, the MME/AMF 103 may begin to page the UE 101 in all cells in the tracking area where the UE 101 belongs and which the UE 101 registered in the MME/AMF 103. In accordance with an exemplary embodiment, after the paging of the UE 101 in the tracking area is repeated N times (N may be predetermined by the network operator based on the network traffic load or any other proper rules), if the UE 101 is still not reachable, the MME/AMF 103 may end the paging of the UE. This may be usually caused by power outage or radio frequency (RF) problems, and the paging may succeed again after these problems are fixed.

According to an exemplary embodiment, in response to a success of the paging of the UE 101 in the tracking area and connection setup for the UE 101, the MME/AMF 103 may fetch the current serving cell ID of the UE 101 from the current serving eNB/gNB of the UE 101, for example, by performing a location report procedure. The current serving eNB/gNB of the UE 101 may be the eNB/gNB 102 or another eNB/gNB in the tracking area of the UE 101. Correspondingly, it may be possible that the current serving cell ID of the UE 101 is different from the cell ID previously stored for the UE 101 by the MME/AMF 103. In this case, the serving cell information stored for the UE 101 may need to be updated with the current serving cell ID of the UE 101.

Although the serving cell information of the UE may not need to be updated usually due to the UE's stationary nature, there may be certain cases where the serving cell of the UE changes. For instance, when the UE such as an IoT device is dismantled and moved to a new place and/or the radio access network for the UE is reconfigured, a serving cell update procedure may be performed to keep the serving cell information of the UE up to date in the MME/AMF. In an exemplary embodiment, when the UE registers again to the network, which usually happens after the UE power on or restart, the MME/AMF may fetch the current serving cell ID of the UE by a location report procedure. If the fetched ID is different from the stored cell ID, then the MME/AMF may update the stored cell ID with the fetched ID.

Figure 2:
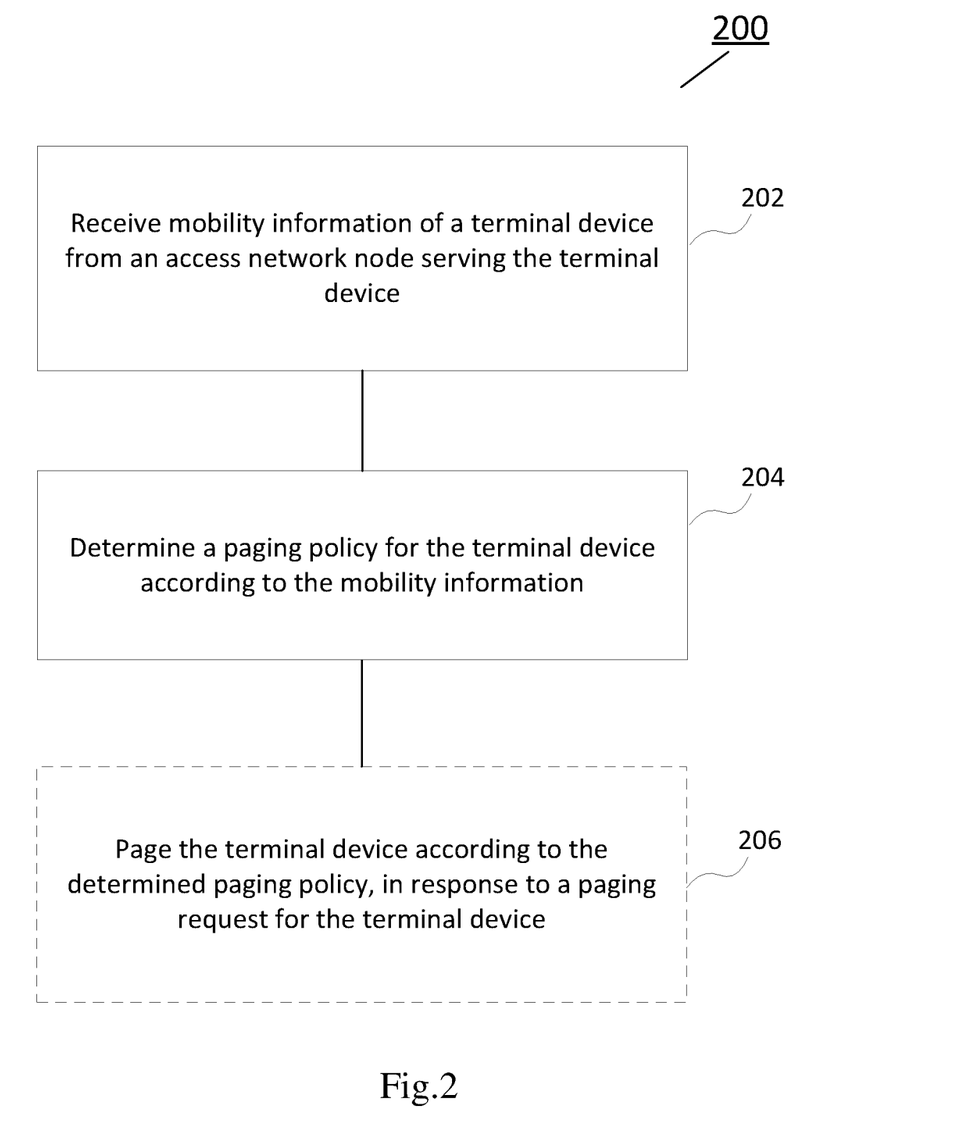
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by an apparatus implemented in a core network node or communicatively coupled to a core network node. In accordance with an exemplary embodiment, the core network node may comprise a MME, an AMF or any other network device being capable of initiating a paging procedure in a communication network.

According to the exemplary method 200 illustrated in FIG. 2, the core network node (such as the MME/AMF 103) may receive mobility information of a terminal device (such as the UE 101) from an access network node (such as the eNB/gNB 102) serving the terminal device, as shown in block 202. In accordance with some exemplary embodiments, the mobility information may comprise motion characteristics of the terminal device. Optionally, the core network node may receive the mobility information of the terminal device in a NAS message, for example, when the terminal device registers to the core network node.

According to the exemplary method 200, the core network node can determine a paging policy for the terminal device according to the mobility information, as shown in block 204. In accordance with an exemplary embodiment, the mobility information may indicate that the terminal device is stationary or movable. The stationary terminal device and the mobile terminal device usually have different motion characteristics and manner of utilizing network resources. Thus, differentiated paging policies may be configured or determined for different types of terminal devices. Optionally, in response to a paging request for the terminal device, the core network node can page the terminal device according to the determined paging policy, as shown in block 206.

According to an exemplary embodiment, in response to the mobility information indicating that the terminal device is stationary, the core network node may send a first request for an identifier of a serving cell of the terminal device to the access network node. Correspondingly, the core network node may receive a first response to the first request from the access network node, so as to obtain the identifier of the serving cell of the terminal device in the first response.

Based at least in part on the obtained identifier, the core network node can determine whether to update a record of a current serving cell of the terminal device at the core network node. For example, if this is the first time the terminal device is registered to the core network node, the obtained identifier may be stored as the current serving cell identifier of the terminal device in the record. Alternatively, for the case where the terminal device registers again to the core network node, the obtained identifier may be stored as the current serving cell identifier of the terminal device in the record, if the previously stored identifier in the record is different from the obtained identifier.

In the case where the mobility information indicates that the terminal device is stationary, the paging policy determined for the terminal device may indicate that a paging area for the terminal device comprises the serving cell of the terminal device. Thus, in response to a paging request for the terminal device, the core network node can page the terminal device in the serving cell.

In accordance with an exemplary embodiment, paging the terminal device in the serving cell may be performed by transmitting a paging message for the terminal device from the core network node to the access network node serving the terminal device. The paging message may comprise the identifier of the serving cell of the terminal device, in order to indicate the access network node to page the terminal device in the serving cell.

Optionally, in response to a failure of paging the terminal device in the serving cell, the core network node can page the terminal device in a tracking area to which the terminal device belongs. As described in connection with FIG. 1, the tracking area may comprise a predefined area for the terminal device. Multiple cells and the corresponding access network nodes may be located in the tracking area. In accordance with an exemplary embodiment, the core network node may send a paging message for the terminal device to all access network nodes in the tracking area. Then, each access network node in the tracking area may broadcast a paging message for the terminal device to all cells pertaining to this access network node.

In response to a success of paging the terminal device in the tracking area, the core network node may send a second request for an identifier of a cell currently serving the terminal device to an access network node currently serving the terminal device. When receiving a second response to the second request from the access network node currently serving the terminal device, the core network node can obtain the identifier of the cell currently serving the terminal device in the second response. Based at least in part on the obtained identifier, the core network node can determine whether to update a record of a current serving cell of the terminal device. For example, if the obtained identifier is different from the previously recorded identifier, the record may be update accordingly.

In accordance with an exemplary embodiment where the mobility information of the terminal device indicates that the terminal device is movable, the paging policy determined for the terminal device may indicate that a paging area for the terminal device comprises a tracking area to which the terminal device belongs. For this case, in response to a paging request for the terminal device, the core network node can page the terminal device in the tracking area of this mobile terminal device.

Figure 3:
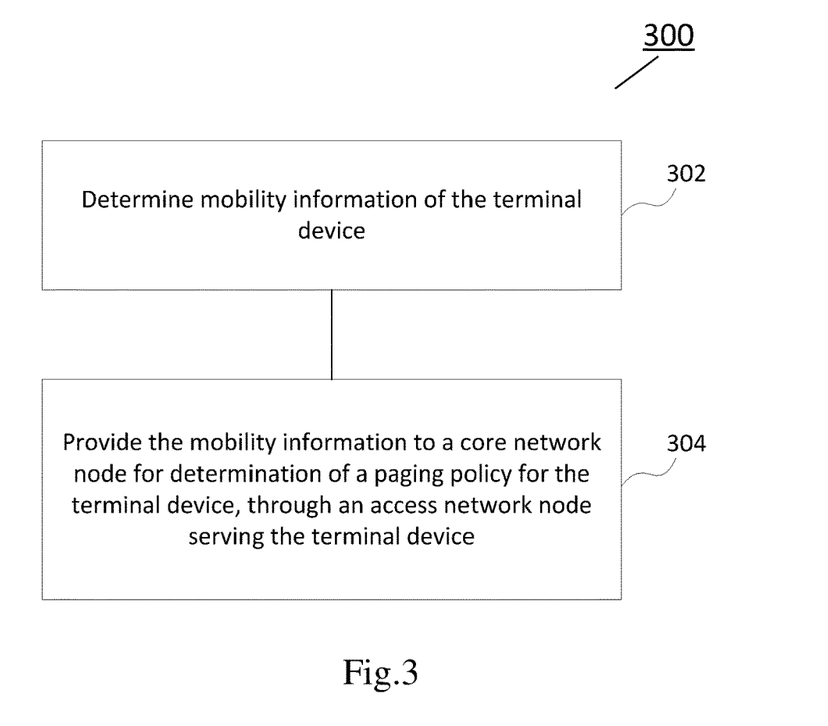
FIG. 3 is a flowchart illustrating a method according to some embodiments of the present disclosure.

FIG. 3 is a flowchart illustrating a method 300 according to some embodiments of the present disclosure. The method 300 illustrated in FIG. 3 may be performed by an apparatus implemented in a terminal device or communicatively coupled to a terminal device. In accordance with an exemplary embodiment, the terminal device may comprise a UE, a mobile station, an IoT device, a smart phone, a portable device, a MTC device, or any other user device being capable of participating in communication of a wireless network.

According to the exemplary method 300 illustrated in FIG. 3, mobility information of the terminal device (such as the UE 101) can be determined in block 302. For instance, the terminal device may determine its mobility information by collecting information of motion characteristics (such as stationary or movable) of the terminal device.

In accordance with an exemplary embodiment, the terminal device may provide the mobility information to a core network node (such as the MME/AMF 103) for determination of a paging policy for the terminal device, through an access network node (such as the eNB/gNB 102) serving the terminal device, as shown in block 304. In the case that the mobility information indicates that the terminal device is stationary, the paging policy determined for the terminal device by the core network node may indicate that a paging area for the terminal device comprises a serving cell of the terminal device. Alternatively, if the mobility information indicates that the terminal device is movable, the paging policy determined for the terminal device may indicate that a paging area for the terminal device comprises a tracking area to which the terminal device belongs. As described with respect to FIG. 2, the paging of the terminal device may be performed according to the paging policy determined for the terminal device.

Figure 4:
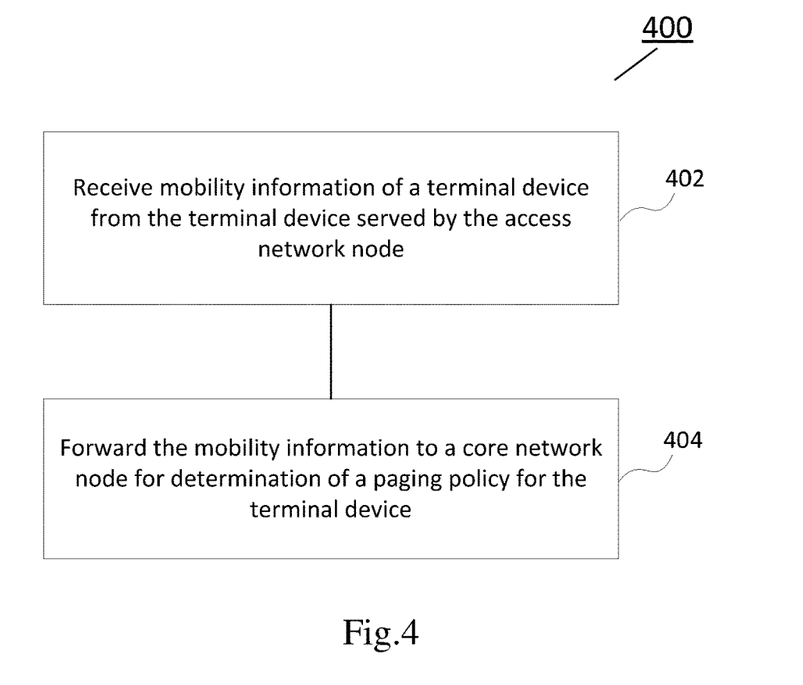
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by an apparatus implemented in an access network node or communicatively coupled to an access network node. In accordance with an exemplary embodiment, the access network node may comprise an eNB, a gNB, a BS, an AP, a relay station or any other network device being capable of performing a paging procedure in a communication network.

According to the exemplary method 400 illustrated in FIG. 4, the access network node (such as the eNB/gNB 102) may receive mobility information of a terminal device (such as the UE 101) from the terminal device served by the access network node, as shown in block 402. In accordance with an exemplary embodiment, the mobility information of the terminal device may be transparent to the access network node. The mobility information may be forwarded to a core network node (such as the MME/AMF 103) for determination of a paging policy for the terminal device, as shown in block 404.

In accordance with an exemplary embodiment, the access network node may receive a first request for an identifier of a serving cell of the terminal device from the core network node, in response to the mobility information indicating that the terminal device is stationary. Then, the access network node may transmit a first response to the first request to the core network node. The first response may comprise the identifier of the serving cell.

As mentioned previously, the paging policy determined for the stationary terminal device may indicate that a paging area for the terminal device comprises the serving cell of the terminal device. In response to a paging request for the terminal device, a paging procedure may be initiated for the terminal device by the core network node.

Optionally, the access network node may receive a paging message for the terminal device from the core network node. The paging message may comprise the identifier of the serving cell of the terminal device. The identified serving cell pertains to the access network node. Accordingly, the access network node can page the terminal device in this serving cell.

In response to a failure of paging the terminal device in the serving cell, the access network node may receive another paging message for the terminal device from the core network node. This paging message may not identify any specific cell for paging the terminal device. In accordance with an exemplary embodiment, the access network node may page the terminal device in all cells pertaining to the access network node.

Optionally, the access network node may receive a second request for an identifier of a cell currently serving the terminal device from the core network node, in response to a success of paging the terminal device in a cell pertaining to the access network node. Then, the access network node can include the identifier of the cell currently serving the terminal device in a second response to the second request, and transmit the second response to the core network node.

It will be appreciated that the paging of the terminal device also may be successful in a cell pertaining to another access network node in the tracking area. In this case, the core network node can fetch the identifier of the cell currently serving the terminal device from the other access network node, for example, by performing a location report procedure.

In accordance with an exemplary embodiment, the paging policy determined for the mobile terminal device may indicate that a paging area for the terminal device comprises a tracking area to which the terminal device belongs. When a paging procedure is initiated for the terminal device by the core network node, the access network node may receive a paging message for the terminal device from the core network node. In this case, the access network node may broadcast a paging message for the terminal device to all cells pertaining to the access network node.

The proposed solution according to one or more exemplary embodiments can enable differentiated paging based on different terminal motion characteristics. Taking the advantage of the proposed paging mechanism makes it possible to send a paging message for a UE to a specific cell rather than all cells in a tracking area or in a cell group. In this way, the paging capacity of a communication network may be enhanced, and radio resources may be efficiently utilized both at the network side and the terminal side.

The various blocks shown in FIG. 2-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
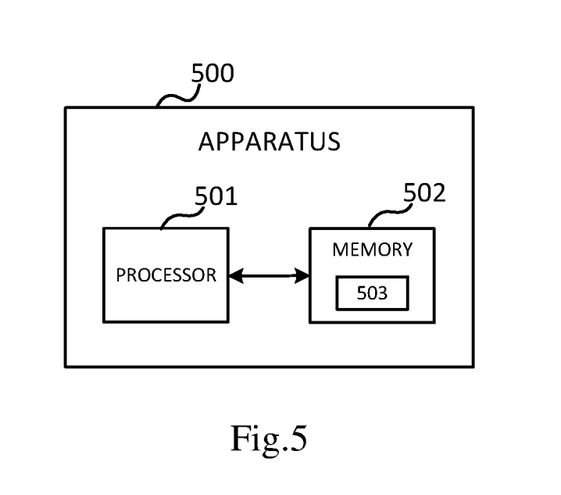
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a core network node as described with respect to FIG. 2, a terminal device as described with respect to FIG. 3, or an access network node as described with respect to FIG. 4.

In some implementations, the one or more memories 502 and the computer program codes 503 may be configured to, with the one or more processors 501, cause the apparatus 500 at least to perform any operation of the method as described in connection with FIG. 2. In some implementations, the one or more memories 502 and the computer program codes 503 may be configured to, with the one or more processors 501, cause the apparatus 500 at least to perform any operation of the method as described in connection with FIG. 3. In other implementations, the one or more memories 502 and the computer program codes 503 may be configured to, with the one or more processors 501, cause the apparatus 500 at least to perform any operation of the method as described in connection with FIG. 4.

Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6:
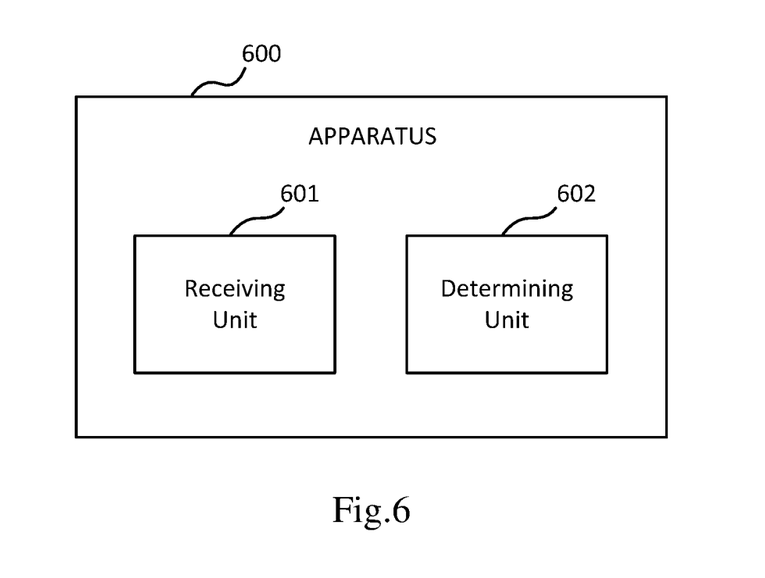
FIG. 6 is a block diagram illustrating an apparatus according to some embodiments of the present disclosure.

FIG. 6 is a block diagram illustrating an apparatus 600 according to some embodiments of the present disclosure. As shown in FIG. 6, the apparatus 600 may comprise a receiving unit 601 and a determining unit 602. In an exemplary embodiment, the apparatus 600 may be implemented at a core network node such as a MME or an AMF. The receiving unit 601 may be operable to carry out the operation in block 202, and the determining unit 602 may be operable to carry out the operation in block 204. Optionally, the receiving unit 601 and/or the determining unit 602 may be operable to carry out more or less operations to implement the proposed methods according to the exemplary embodiments of the present disclosure.

Figure 7:
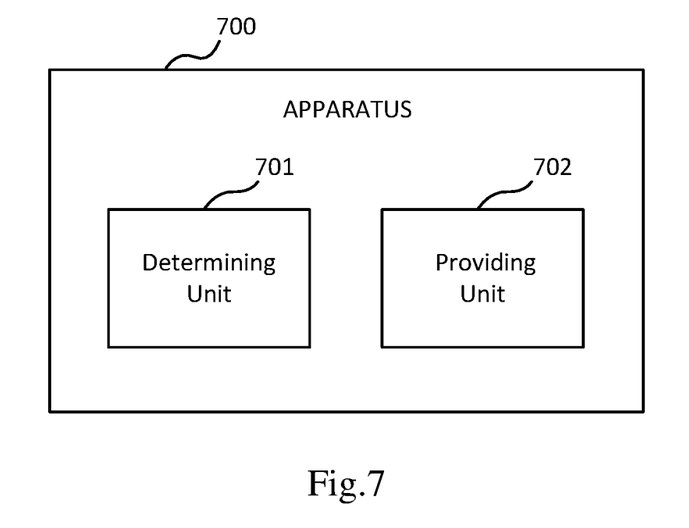
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a determining unit 701 and a providing unit 702. In an exemplary embodiment, the apparatus 700 may be implemented at a terminal device such as a UE. The determining unit 701 may be operable to carry out the operation in block 302, and the providing unit 702 may be operable to carry out the operation in block 304. Optionally, the determining unit 701 and/or the providing unit 702 may be operable to carry out more or less operations to implement the proposed methods according to the exemplary embodiments of the present disclosure.

Figure 8:
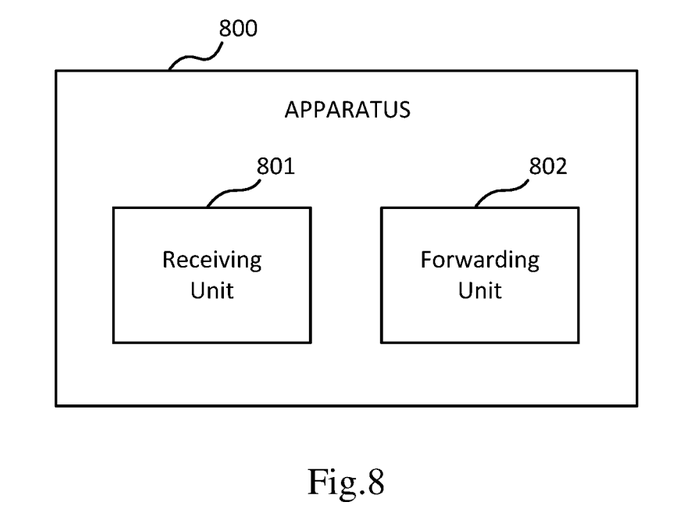
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a receiving unit 801 and a forwarding unit 802. In an exemplary embodiment, the apparatus 800 may be implemented at an access network node such as an eNB or a gNB. The receiving unit 801 may be operable to carry out the operation in block 402, and the forwarding unit 802 may be operable to carry out the operation in block 404. Optionally, the receiving unit 801 and/or the forwarding unit 802 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a core network node, comprising:
   receiving mobility information of a terminal device from an access network node serving the terminal device, wherein the mobility information comprises an indication indicating whether the terminal device is stationary or movable, wherein the mobility information is received in a non-access stratum (NAS) message, wherein the mobility information is represented by a parameter of 1-bit size;
   determining a paging policy for the terminal device according to the mobility information, wherein determining the paging policy comprises determining a paging area for the terminal device even if the terminal device is in idle mode; and
   fetching, from at least another access network node, an identifier of a cell in the paging area that is currently serving the terminal device, wherein the other access network node is distinct from the access network node.

2. The method according to claim 1, further comprising:
   sending a first request for an identifier of a serving cell of the terminal device to the access network node, in response to the mobility information indicating that the terminal device is stationary; and
   receiving a first response to the first request from the access network node to obtain the identifier of the serving cell in the first response.

3. The method according to claim 2, wherein the determined paging policy indicates that a paging area for the terminal device comprises the serving cell of the terminal device.

4. The method according to claim 3, further comprising:
   paging the terminal device in the serving cell, in response to a paging request for the terminal device.

5. The method according to claim 4, wherein said paging the terminal device in the serving cell comprises:
   transmitting a paging message for the terminal device to the access network node, wherein the paging message comprises the identifier of the serving cell to indicate the access network node to page the terminal device in the serving cell.

6. The method according to claim 4, further comprising:
   paging the terminal device in a tracking area to which the terminal device belongs, in response to a failure of paging the terminal device in the serving cell.

7. The method according to claim 6, further comprising:
   sending a second request for an identifier of a cell currently serving the terminal device to an access network node currently serving the terminal device, in response to a success of paging the terminal device in the tracking area; and
   receiving a second response to the second request from the access network node currently serving the terminal device to obtain the identifier of the cell currently serving the terminal device in the second response.

8. The method according to claim 2, further comprising:
   determining whether to update a record of a current serving cell of the terminal device at the core network node, based at least in part on the obtained identifier.

9. The method according to claim 1, wherein the determined paging policy indicates that a paging area for the terminal device comprises a tracking area to which the terminal device belongs, in response to the mobility information indicating that the terminal device is movable.

10. The method according to claim 9, further comprising:
    paging the terminal device in the tracking area, in response to a paging request for the terminal device.

11. An apparatus, comprising:
    one or more processors; and
    one or more memories comprising computer program codes,
    the one or more memories and the computer program codes configured to, with the one or more processors, cause the apparatus at least to:
    receive mobility information of a terminal device from an access network node serving the terminal device, wherein the mobility information comprises an indication indicating whether the terminal device is stationary or movable, wherein the mobility information is received in a non-access stratum (NAS) message, wherein the mobility information is represented by a parameter of 1-bit size;
    determine a paging policy for the terminal device according to the mobility information, wherein the one or more memories, computer program codes and one or more processors configured to cause the apparatus to determine the paging policy for the terminal device according to the mobility information comprise one or more memories, computer program codes, and one or more processors configured to cause the apparatus to determine a paging area for the terminal device even if the terminal device is in idle mode; and
    fetch, from at least another access network node, an identifier of a cell in the paging area that is currently serving the terminal device, wherein the other access network node is distinct from the access network node.

12. The apparatus according to claim 11, wherein the one or more memories and the computer program codes are configured to, with the one or more processors, cause the apparatus at least to:
send a first request for an identifier of a serving cell of the terminal device to the access network node, in response to the mobility information indicating that the terminal device is stationary; and
receive a first response to the first request from the access network node to obtain the identifier of the serving cell in the first response.

13. An apparatus, comprising:
one or more processors; and
one or more memories comprising computer program codes, the one or more memories and the computer program codes configured to, with the one or more processors, cause the apparatus at least to:
determine mobility information of the apparatus, wherein the mobility information comprises an indication indicating whether a terminal device is stationary or movable, wherein the mobility information is received in a non-access stratum (NAS) message, wherein the mobility information is represented by a parameter of 1-bit size;
provide the mobility information to a core network node for determination of a paging policy for the apparatus, through an access network node serving the apparatus, wherein the one or more memories, computer program codes, and one or more processors configured to cause the apparatus to provide the mobility information to the core network node for determination of the paging policy for the apparatus, through the access network node serving the apparatus, comprise one or more memories, computer program codes, and one or more processors configured to cause the apparatus to provide a paging area for the terminal device even if the terminal device is in idle mode; and
receive a paging message from the core network node, wherein the paging message is a response to the core network node receiving, from at least another access network node, an identifier of a cell in the paging area that is currently serving the terminal device, wherein the other access network node is distinct from the access network node.

14. The apparatus according to claim 13, wherein the mobility information indicates that the terminal device is stationary, and wherein the paging policy indicates that a paging area for the terminal device comprises a serving cell of the terminal device.

15. The apparatus according to claim 13, wherein the mobility information indicates that the terminal device is movable, and wherein the paging policy indicates that a paging area for the terminal device comprises a tracking area to which the terminal device belongs.

* * * * *